United States Patent [19]
Ishii et al.

[11] Patent Number: 6,148,243
[45] Date of Patent: Nov. 14, 2000

[54] SOUND PROCESSING METHOD AND SYSTEM

[75] Inventors: Masashi Ishii; Hiraku Sonobe, both of Yokohama; Tetsuo Kikuchi, Ayase; Munenori Shusa, Yokohama, all of Japan

[73] Assignee: Canon Kabushiki Kaisha, Tokyo, Japan

[21] Appl. No.: 08/831,950

[22] Filed: Apr. 2, 1997

[30] Foreign Application Priority Data

Apr. 5, 1996 [JP] Japan .................................. 8-083893
Apr. 5, 1996 [JP] Japan .................................. 8-083900

[51] Int. Cl.[7] .............................. G06F 17/00; G06F 1/16; H04R 1/02
[52] U.S. Cl. .............................. 700/94; 381/98; 381/333; 381/388; 361/683; 361/686
[58] Field of Search .............................. 381/77, 101, 102, 381/104, 107, 109, 306, 333, 388, 98, 1; 361/679, 682–3, 686; 364/708.1; 700/94

[56] References Cited

U.S. PATENT DOCUMENTS

| | | |
|---|---|---|
| 4,356,349 | 10/1982 | Robinson .................................. 381/1 |
| 4,603,429 | 7/1986 | Carber .................................. 381/1 |
| 4,980,914 | 12/1990 | Kunugi .................................. 381/1 |
| 5,481,616 | 1/1996 | Freadman .................................. 381/77 |
| 5,604,663 | 2/1997 | Shin et al. .................................. 361/686 |
| 5,692,058 | 11/1997 | Eggers et al. .................................. 381/107 |
| 5,751,816 | 5/1998 | Howard .................................. 381/109 |
| 5,802,186 | 9/1998 | Kubota .................................. 381/107 |
| 5,805,412 | 9/1998 | Yanagisawa et al. .................................. 361/686 |
| 5,812,688 | 9/1998 | Gibson .................................. 381/119 |

*Primary Examiner*—Minsun Oh Harvey
*Assistant Examiner*—Xu Mei
*Attorney, Agent, or Firm*—Fitzpatrick, Cella, Harper & Scinto

[57] ABSTRACT

Two systems each having an audio signal output unit are docked together, and audio signals are controlled in accordance with the characteristics of each system to thereby output sounds of good quality. If sounds are output from the two systems at the same time, the frequency band or sound volume of the audio signal is controlled in accordance with the characteristics of each speaker to thereby output sounds easy to listen.

33 Claims, 9 Drawing Sheets

SOUND PROCESSING METHOD AND SYSTEM

BACKGROUND OF THE INVENTION

1. Field of the Invention

The present invention relates to an information processing method and system, and more particularly to a sound processing method and system for a portable computer having a speaker system.

The present invention relates to an information processing method and system, and more particularly to an information processing method and system in which two or more sound output series are controlled.

2. Related Background Art

With recent technology advancement, computers are rapidly growing. Main streams are computers having versatile multimedia functions such as audio and video. Such a trend is also accompanied by portable computers generally called note type personal computers. Apparatuses such as note type personal computers which give prominence to portability require high performance and high density. It is therefore difficult to mount a large diameter speaker having an advantage in reproducing low frequency sounds, or to reserve a speaker back space allowing the speaker performance to exhibit sufficiently. Even if such a space can be reserved at the design stage, the space has been used preferentially for other devices of state of the art or removed for compactness. The performance of a speaker built in a note type personal computer has been therefore traded off, and in order to reproduce sounds of good quality, the built-in speaker is switched to a separate speaker box or to a separate speaker mounted on a docking station having a relatively large space and used for extending the functions of a note type personal computer.

Such a docking station is provided with various input/output devices, and some docking stations are provided even with an amplifier, a CD-ROM drive, and a speaker. The docking station of this type has a sound volume knob and can be used by itself for reproducing CD music, without docking to a note type personal computer.

Most of note type personal computers are provided with a sound volume knob. A user can adjusts the sound volume of a speaker (or head-mount speaker) by operating upon this volume knob.

The above-described prior art is, however, associated with the following problems.

1) If a personal computer is connected to one of speaker boxes or one of docking stations, acoustic sense such as frequency characteristics and sound output levels becomes different for each speaker box or docking station because of the different characteristics thereof.

2) If a speaker box or a docking station is connected to one of personal computers, acoustic sense such as frequency characteristics and sound output levels becomes different for each personal computer because of the different characteristics thereof.

3) Since a docking station and a note type personal computer each have a volume knob, if they are docked together, it is necessary to operate upon both the knobs, complicating the user operation, or if one of the knobs is invalidated, it is difficult to a non-skilled user to discriminate between the invalid and valid knobs.

4) In hot docking a note type personal computer while it is operating, the volume of sounds output from the speaker of the docking station may become too large or small according to the setting position of the knob at that time.

SUMMARY OF THE INVENTION

It is an object of the present invention to realize a constant volume of sounds in terms of acoustic sense irrespective of different characteristics of each speaker box or docking station.

It is another object of the present invention to realize a constant volume of sounds in terms of acoustic sense irrespective of different characteristics of each personal computer.

It is a further object of the present invention to improve the sound quality by reproducing sounds from both an external speaker system and a speaker system of a note type personal computer by distributing audio signals to them when they are docked.

It is a still further object of the present invention to provide a note type personal computer and a docking system wherein they can be used discretely by adjusting the volume level, or if they are docked together, one of the volume knobs is invalidated and the other is used for adjusting the sound volume, thereby facilitating the volume adjustment operation and eliminating a change in volume when docked.

It is another object of the invention to provide a note type personal computer and a docking system wherein a user can select a desired one of two speakers, a two-way speaker system can be configured to improve the sound quality, and they can be docked together while one of the speakers is operating, the user being able to confirm the operation on a display screen of the note type personal computer.

DETAILED DESCRIPTION OF THE PREFERRED EMBODIMENTS (First Embodiment)

Figure 1:
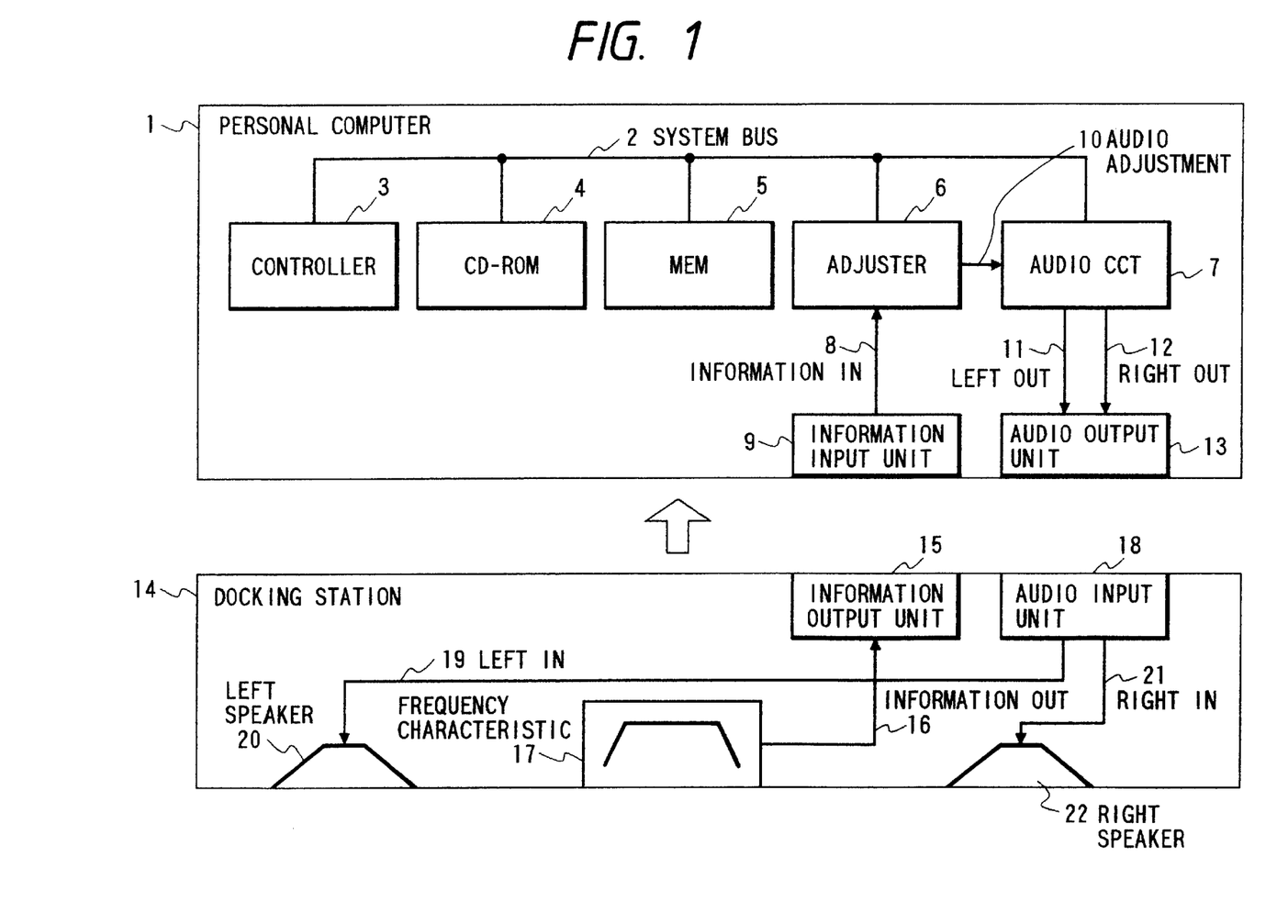
FIG. 1 is a diagram showing the structure of a first embodiment according to the present invention.

FIG. 1 is a block diagram showing the structure of an information processing system according to the first embodiment of the invention.

In FIG. 1, reference numeral 1 represents a personal computer, reference numeral 2 represents a system bus for data transfer in the personal computer, and reference numeral 3 represents a controller (CPU) for controlling the operation of the personal computer in accordance with control programs stored in a memory. Reference numeral 4 represents a CD-ROM drive, reference numeral 5 represents the memory for storing data, reference numeral 6 represents an adjuster for adjusting the characteristics of an audio signal supplied from an audio circuit, reference numeral 7 represents the audio circuit for outputting an audio signal, and reference numeral 8 represents an information input line for transferring information from an information input unit to the adjuster 6. Reference numeral 9 represents the information input unit for inputting information from the outside of the personal computer, reference numeral 10 represents an audio circuit adjusting signal line for transferring an audio circuit adjusting signal from the adjuster, reference numeral 11 represents a left audio signal output line for transferring a left audio signal from the audio circuit, reference numeral 12 represents a right audio signal output line for transferring a right audio signal from the audio circuit, and reference numeral 13 represents an audio signal output unit for outputting an audio signal from the personal computer.

Reference numeral 14 represents a docking station, reference numeral 15 represents an information output unit for outputting information from the docking station, reference numeral 16 represents an information output unit for transferring frequency characteristic information to the information output unit, reference numeral 17 represents the frequency characteristic information of speakers of the docking station, and reference numeral 18 represents an audio signal input unit for inputting an audio signal from the outside of the docking station. Reference numeral 19 represents a left audio signal input line for receiving a left audio signal from the audio signal input unit and transferring it to a left speaker, reference numeral 20 represents the left speaker for generating sounds from the left audio signal, reference numeral 21 represents a right audio signal input line for receiving a right audio signal from the audio signal input unit and transferring it to a right speaker, and reference numeral 22 represents the right speaker for generating sounds from the right audio signal.

The frequency characteristic information indicates the frequency characteristics of the right and left speakers 22 and 20 in the form of values in each frequency band. The docking station 14 has a mechanism for docking the personal computer 1, and when docked, the information input unit 9 is connected to the information output unit 15, and the audio signal output unit 13 is connected to the audio signal input unit 18.

The memory 5 may be a ROM or RAM in which control programs, various parameters, and working areas for the controller 3 to control various processes to be executed by the personal computer, are prepared. The control programs and parameters may be stored in advance in the memory 5, or may be read from another memory and stored in the memory 5. This other memory may be a removable CD-ROM or FD mounted on the personal computer, or a memory in another personal computer accessible via a public telephone line or LAN.

With the system constructed as above, as the personal computer 1 is mounted on the docking station 14, the information input unit 9 is connected to the information output unit 15, and the audio signal output unit 13 is connected to the audio signal input unit 18. This docking state is detected by each of the personal computer 1 and the docking station 14. In this docking state, the frequency characteristic information 17 in the docking station 14 is read by the adjuster 6 of the personal computer 1 via the information output line 18, information output unit 15, information input unit 9, and information input line 8. In accordance with the frequency characteristic information 17 of the docking station 14 and the frequency characteristics of the audio circuit 7, the adjuster 6 adjusts the signal level of each frequency band of the audio circuit 7 so that the frequency characteristics of the output audio level of sounds to be generated from the right and left speakers 22 and 20 become flat. For example, the output audio level in one frequency band smaller than the other frequency bands is adjusted larger, whereas the output audio level in one frequency band larger than the other frequency bands is adjusted smaller. Audio signals read from CD-ROM 4 are supplied, via the right and left audio signal output lines 12 and 11, audio signal output unit 13, audio signal input unit 18, and right and left audio signal input lines 21 and 19, to the right and left speakers 22 and 20 which then generate voices having the flat frequency characteristics.

(Second Embodiment)

Figure 2:
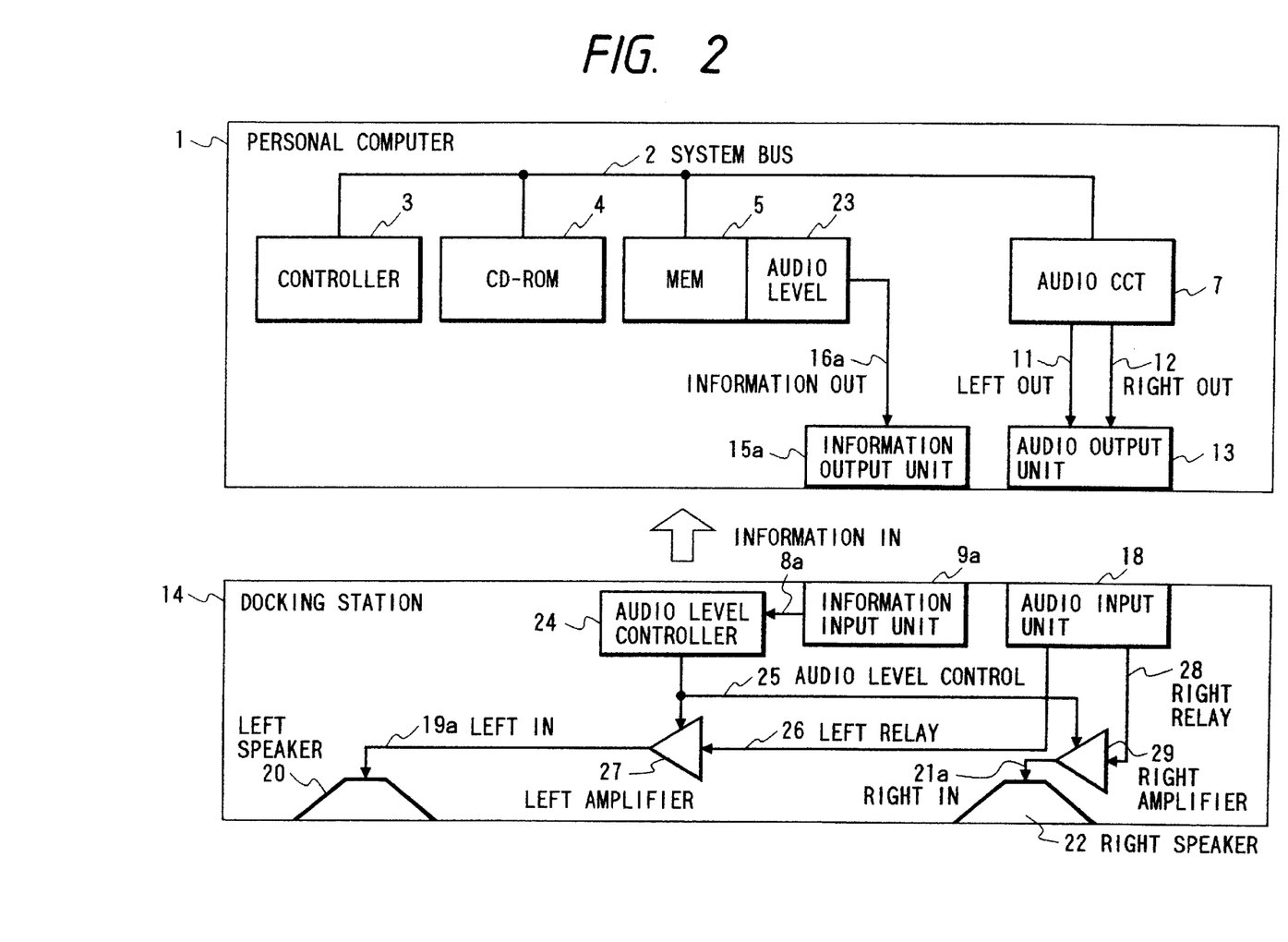
FIG. 2 is a diagram showing the structure of a second embodiment according to the present invention.

FIG. 2 is a block diagram showing the structure of an information processing system according to the second embodiment of the invention.

In FIG. 2, reference numeral 1 represents a personal computer, reference numeral 2 represents a system bus for data transfer in the personal computer, and reference numeral 3 represents a controller for controlling the operation of the personal computer. Reference numeral 4 represents a CD-ROM drive, reference numeral 5 represents a memory for storing data, reference numeral 23 represents audio level data stored in the memory representative of an audio level to be output from the personal computer, and reference numeral 7 represents an audio circuit for outputting an audio signal. Reference numeral 16*a* represents an information output line for transferring the audio level to an information output line, reference numeral 15*a* represents an information output unit for outputting information from the personal computer, reference numeral 11 represents a left audio signal output line for transferring a left audio signal from the audio circuit, reference numeral 12 represents a right audio signal output line for transferring a right audio signal from the audio circuit, and reference numeral 13 represents an audio signal output unit for outputting an audio signal from the personal computer.

Reference numeral 14 represents a docking station, reference numeral 9*a* represents an information input unit for receiving information from the outside of the docking station, and reference numeral 8*a* represents an information input line for transferring information from the information input unit to an audio level controller 24 which supplies gain control signals in accordance with the information from an information input line 8*a*, to a left audio signal amplifier 27 and a right audio signal amplifier 29 via an audio level control line 25. The audio level control line 25 supplies a signal from the audio level controller 24 to the right and left audio signal amplifiers 29 and 27. Reference numeral 18 represents an audio signal input unit for receiving an audio signal from the outside of the docking station. Reference numeral 26 represents a left audio signal relay line for receiving a left audio signal from the audio signal input unit and transferring it to the left audio signal amplifier 27 which amplifies an audio signal from the left audio signal relay line 26 and outputs it to a left audio signal input line 19a. The left audio signal input line 19a received the left audio signal from the left audio signal amplifier 27 transfers it to a left speaker 20 which generates voices corresponding to the left audio signal. Reference numeral 28 represents a right audio signal relay line for receiving a right audio signal from the audio signal input unit and transferring it to the right audio signal amplifier 29 which amplifies an audio signal from the right audio signal relay line 28 and outputs it to a right audio signal input line 21a. The right audio signal input line 21a received the right audio signal from the right audio signal amplifier 29 transfers it to a right speaker 22 which generates voices corresponding to the right audio signal.

The audio level data 23 indicates an amplitude of an audio signal of a standard level. The docking station 14 has a mechanism for docking the personal computer 1, and when docked, the information output unit 15a is connected to the information input unit 9a, and the audio signal output unit 13 is connected to the audio signal input unit 18. In FIG. 2, similar elements to those shown in FIG. 1 are represented by using identical reference numerals, and the detailed description thereof is omitted.

With the system constructed as above, as the personal computer 1 is mounted on the docking station 14, the information output unit 15a is connected to the information input unit 9a, and the audio signal output unit 13 is connected to the audio signal input unit 18. This docking state is detected by each of the personal computer 1 and the docking station 14. In this docking state, the audio signal level data 23 in the personal computer 1 is read by the audio level controller 24 of the docking station 14 via the information output line 16a, information output unit 15a, information input unit 9a, and information input line 8a. In accordance with the audio level data 23 supplied from the personal computer 1 and the efficiencies of the right and left speakers 22 and 20, the audio level controller 24 adjusts the gains of the right and left audio signal amplifiers 29 and 27 via the audio level control line 25 so as to set a predetermined audio level of output sounds. Audio signals read from CD-ROM 4 are supplied, via the right and left audio signal output lines 12 and 11, audio signal output unit 13, audio signal input unit 18, right and left audio signal input lines 21 and 19, and right and left audio signal relay lines 28 and 26, to the right and left audio signal amplifiers 29 and 27 and to the right and left speakers 22 and 20 which then generate voices having the predetermined audio level.

With the above structure, even if a combination of a personal computer 1 and a docking station 14 is changed, sounds in an optimum state matching the frequency characteristics of each combination can be generated from the speakers.

(Third Embodiment)

The detailed description of the third embodiment will be described with reference to the accompanying drawings.

Figure 3:
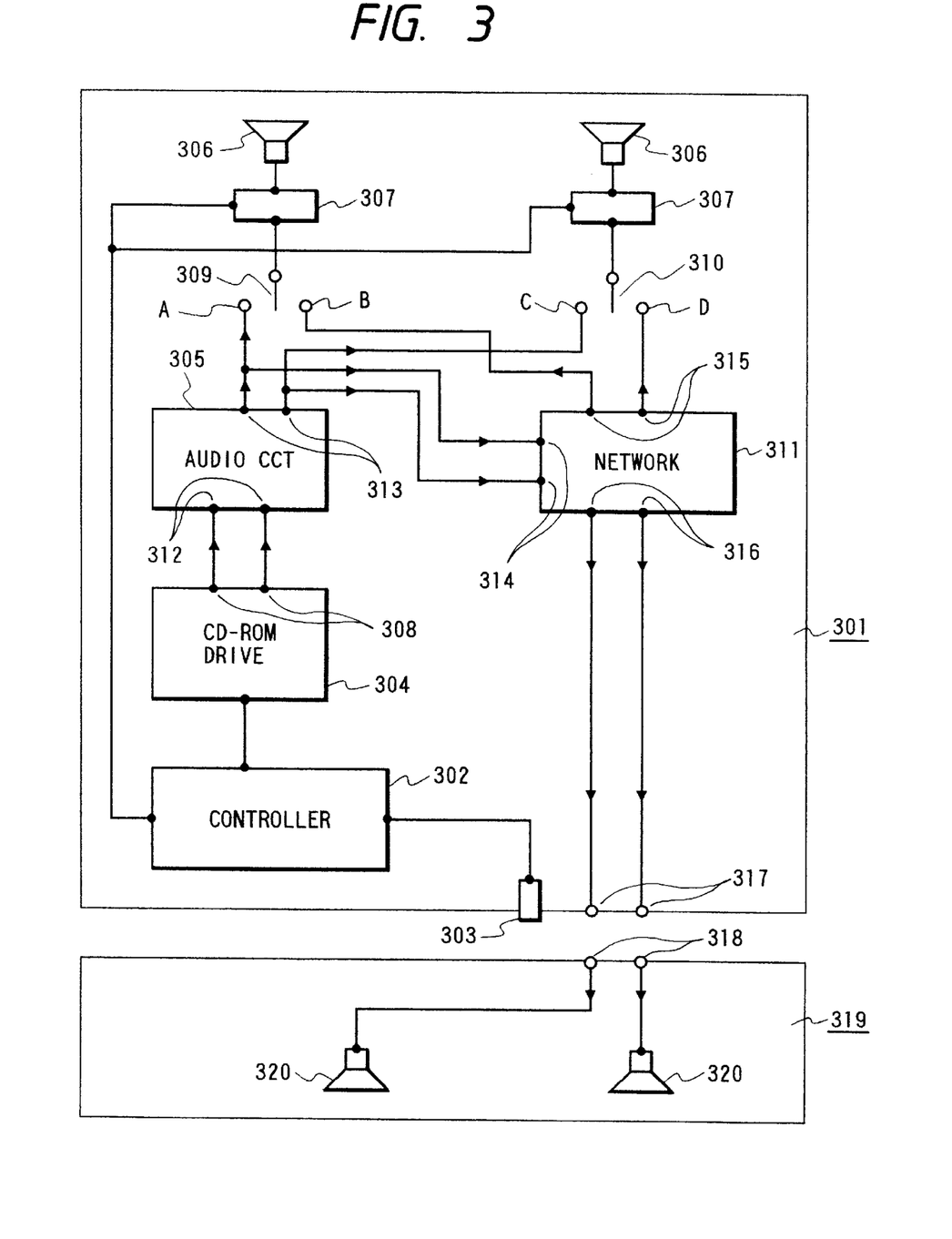
FIG. 3 is a circuit diagram showing the structure of a third embodiment according to the present invention.

FIG. 3 is a circuit block diagram of an information processing apparatus according to the third embodiment of the invention. Reference numeral 301 represents a personal computer having a controller 302. The controller 302 controls a CD-ROM drive 304 and the like, and sends an on/off signal to switch controllers 307 in response to a signal from a docking sensor 303. In response to this on/off signal, the switch controllers 307 connect a left switch 309 and a right switch 310 to either terminal A or B, or terminal C or D. The controller 302 performs the following various controls in accordance with control programs stored in a memory (not shown). The CD-ROM drive 304 is built in the personal computer 301 as one example of audio output devices, and reads data from a loaded removable CD-ROM and sends stereo audio signals from audio output terminals 308 to an audio circuit 305, under the control of the controller 302. These audio signals are input via CD audio input terminals 312 to the audio circuit 305 which amplifies the input audio signals and outputs from audio output terminals 313. The amplified audio signals either directly drive built-in speakers 306 or are input via audio terminals 314 to a known network circuit 311 constituted of coils and capacitors. In the case wherein the amplified audio signals are input to the network circuit 311, they are divided into low frequency audio signals (generally 1 kHz or lower) and middle/high frequency audio signals (generally from 1 kHz or higher up to 20 kHz), the former being output from low frequency audio signal output terminals 316 and the latter being output from high frequency audio signal output terminals 315. The middle/high frequency audio signals drive the built-in speakers 306, whereas the low frequency audio signals drive external speakers connected to external audio output terminals 317 provided on the personal computer side. In this embodiment, used as the external speakers are station speakers 320 of a docking station 319 which extends the functions of the personal computer 301 docked in the docking station. As external audio input terminals 318 of the docking station 319 are connected to the external audio output terminals 317 of the personal computer 301, the middle/high frequency audio signals supplied to the docking station 319 drive the station speakers 320.

Figure 4:
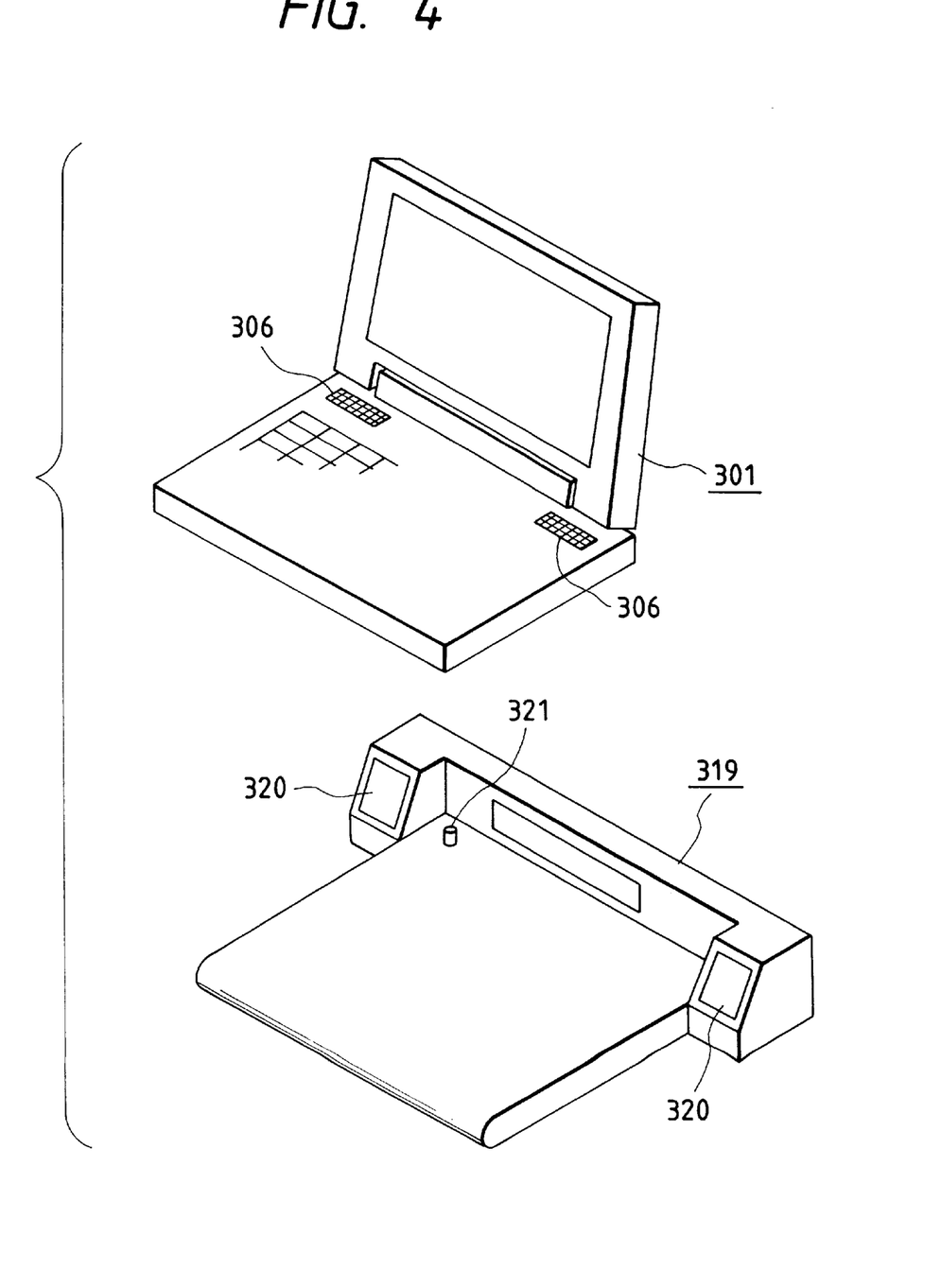
FIG. 4 is a schematic perspective view showing the separated state of a note type personal computer and a docking station.

The perspective view of the system of this embodiment structured as above is shown in a schematic form in FIG. 4. As shown in FIG. 4, if the note type personal computer 301 and the docking station 319 are separated, i.e., if the personal computer 301 is used singularly, the controller 302 detects an off-state of the docking sensor 303 and sends an off-signal to the switch controllers 307. Specifically, a sensor rod 321 mounted on the side of the docking station 319 does not depress (turn on) the docking sensor switch 303 of the personal computer. While the switch controllers 307 receive this off-signal, the switch controllers 307 cause the right and left switches 309 and 307 to connect the terminals C and A, respectively. The audio signals output from the CD-ROM drive 304 and amplified by the audio circuit 313 are not therefore supplied to the network circuit 311 but directly drive the built-in speakers 306. Therefore, all audio signals output from the CD-ROM drive 304 are supplied to drive the built-in speakers 306. These built-in speakers 306 are designed to have a diameter and its structure suitable for outputting middle/high frequency sounds (generally from 1 kHz or higher to 20 kHz or lower). This design results from a size limitation of a note type personal computer being unable to use a speaker having a large diameter and therefore unable to produce low frequency sounds, and from an emphasis on the main frequency components (1 to 8 kHz) of a human voice bandwidth when taken into consideration the use conditions required at a minimum such as network conference.

Figure 5:
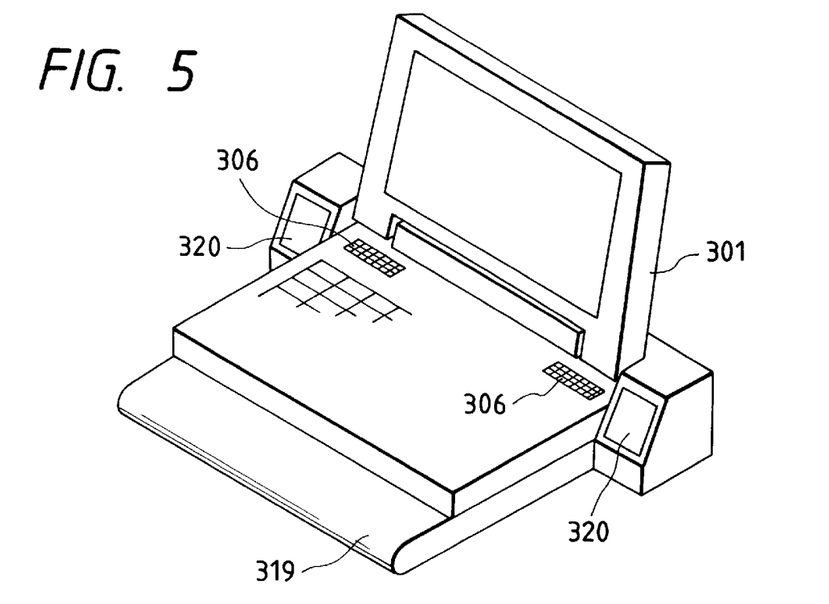
FIG. 5 is a schematic perspective view showing the docked state of a note type personal computer and a docking station.

As shown in FIG. 5, as the personal computer 301 and the docking station 319 are connected, the external output terminals 317 are connected to the external input terminals 318, and the controller 302 detects an on-state of the docking sensor 303 and sends an on-signal to the switch controllers 307. Specifically, the sensor rod 321 mounted on the side of the docking station 319 depresses (turns on) the docking sensor switch 303 of the personal computer. While the switch controllers 307 receive this on-signal, the switch controllers 307 cause the right and left switches 309 and 307 to connect the terminals D and B, respectively. The audio signals output from the CD-ROM drive 304 and amplified by the audio circuit 313 are supplied to the network circuit 311. Therefore, the middle/high frequency audio signals drive the built-in speakers 306, whereas the low frequency audio signals drive the station speakers 320. Namely, the audio signals output from the CD-ROM drive are divided into two portions and supplied to the two pairs of the speakers. The station speakers 320 are designed to have a diameter and its structure suitable for outputting low frequency sounds (generally 1 kHz or lower). This design results from a small limitation in size of a docking station, from a capability of mounting a speaker having a large diameter and easy to generate low frequency sounds, and from a reservation of a space at the back of the speaker.

With the above structure of this embodiment, transfer of audio signals to the note type personal computer and the docking station is controlled so that the two-way speaker system capable of covering sounds of low and high frequency ranges can be realized by a personal computer.

(Fourth Embodiment)

Figure 6:
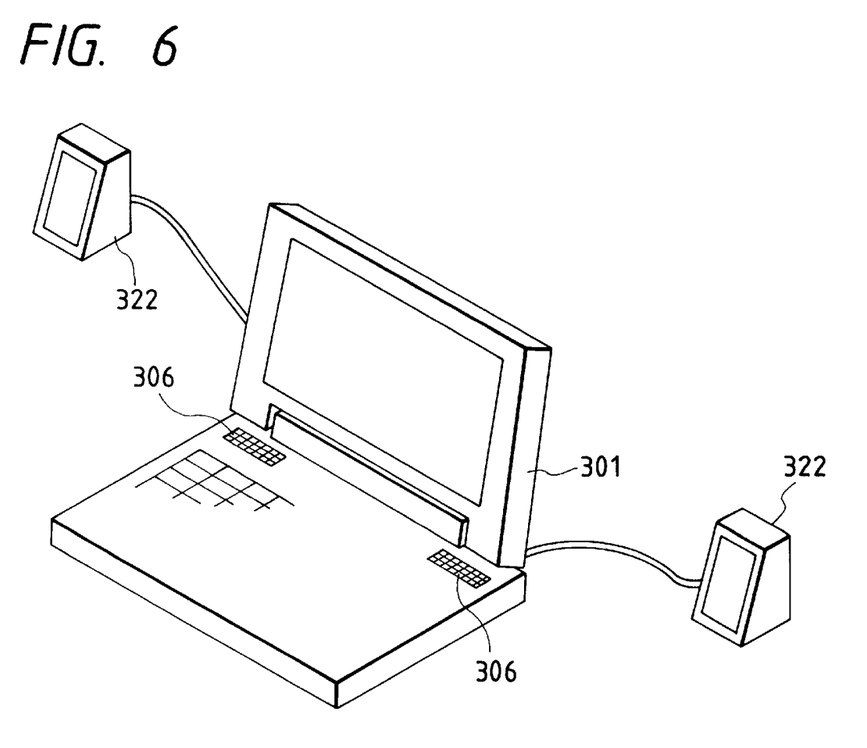
FIG. 6 is a schematic perspective view of an information processing system according to a fourth embodiment of the present invention.

In the third embodiment, the low frequency speakers are mounted on the docking station to realize the two-way speaker system by using the note type personal computer and the docking station. The low frequency speakers are not limited to being mounted on the docking station, but they may be external speakers. The perspective view of this embodiment is shown in FIG. 6. Reference numeral 322 indicates external speakers. The different points from the third embodiment are as follows. A sensor like the docking sensor 303 of the third embodiment is mounted near the external audio output terminals 317 or on the external audio output terminals 317. When the external speakers are connected, this connection is immediately detected with this sensor so that the audio signals are supplied to the network circuit 311 to distribute the low frequency audio signals to the external speakers.

It is apparent from the foregoing description that audio signals may be divided into three frequency bands, and speakers are provided in correspondence with the three frequency bands to thereby realize a three-way speaker system.

Both in the third and fourth embodiments, obviously, means for the note type personal computer to detect a connection of the docking station or external speakers may be a manual means, and means for generating audio signals is not limited to a CD-ROM drive.

(Fifth Embodiment)

The detailed description of an information processing system according to the fifth embodiment of the present invention will be given with reference to the accompanying drawings.

Figure 8:
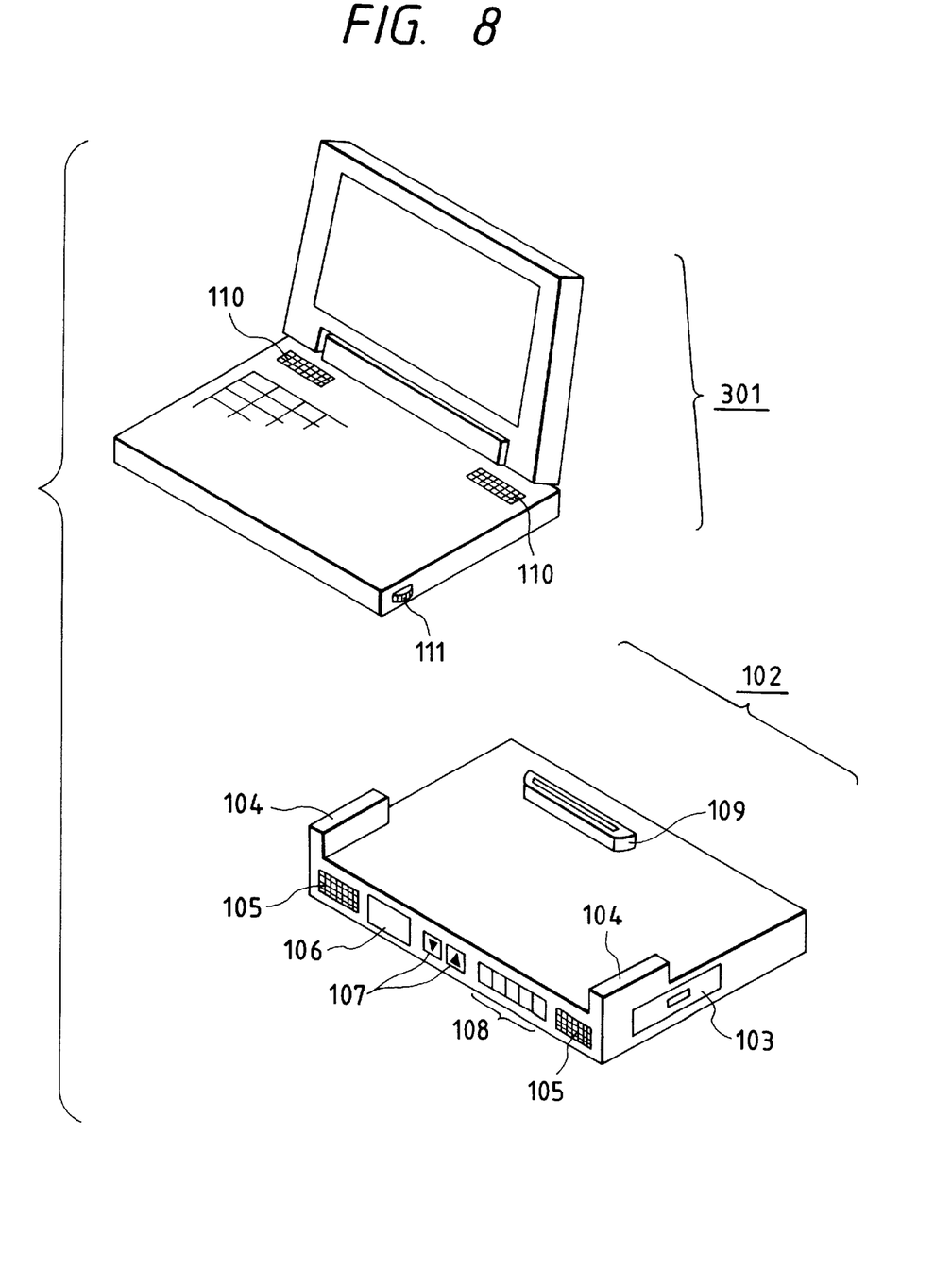
FIG. 8 is a schematic perspective view showing the separated state of the information processing system of the fifth embodiment.

FIG. 8 is a schematic perspective view of the information processing system of this embodiment. Reference numeral 301 represents a note type personal computer and reference numeral 102 represents a docking station connectable to the note type personal computer 301. The note type personal computer 301 has stereo speakers 110, a sound volume dial 111 (of a general known variable resistor type), and an amplifier circuit (not shown). Audio signals from a sound source such as a hard disk and a floppy disk are output from the speakers 110 and an operator can adjust as desired the sound volume with the volume dial 111. The docking station 102 has a CD-ROM drive 103, station stereo speakers 105, a display panel 106, a software volume structure 107, a console panel 108, and an amplifier circuit (not shown). Similar to the note type personal computer 301, the docking station 102 can singularly reproduce a music CD and output sounds from the speakers 105. The docking station 102 is mounted with a docking connector 109 which is electrically coupled to a connector (not shown) of the note type personal computer 301, this docking state being shown in FIG. 9.

Figure 7:
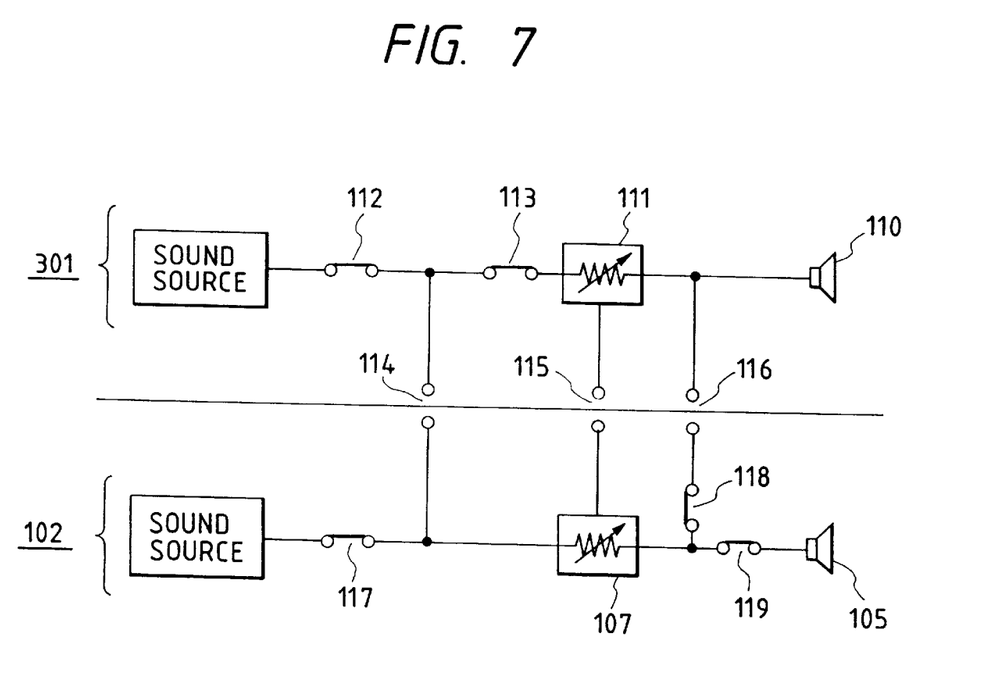
FIG. 7 is a circuit block diagram of a fifth embodiment according to the present invention.

The system having such a structure is represented by circuit block diagrams of FIGS. 7, 10, 11, and 12. The circuit block diagram of FIG. 7 shows a separate state of the note type personal computer 301 and the docking station 102 shown in FIG. 8. Contacts 114, 115, and 116 are open in this state. Reference numerals 112, 113, 117, 118, and 119 represent switches. In the docked state, the contacts 114, 115, and 116 electrically connect the note type personal computer 1 and the docking station 102 (in the separate state shown in FIG. 8, they are not electrically connected). In the state shown in FIGS. 7 and 8, the note type personal computer 301 and the docking station 102 can singularly reproduce sounds from audio signals supplied from the sound source, and generate sounds from the speakers. An operator can adjust as desired the sound volume with the volume slider 111 and software volume structure 107. In this state, the switches 112, 113, 117, and 119 are all closed.

Figure 9:
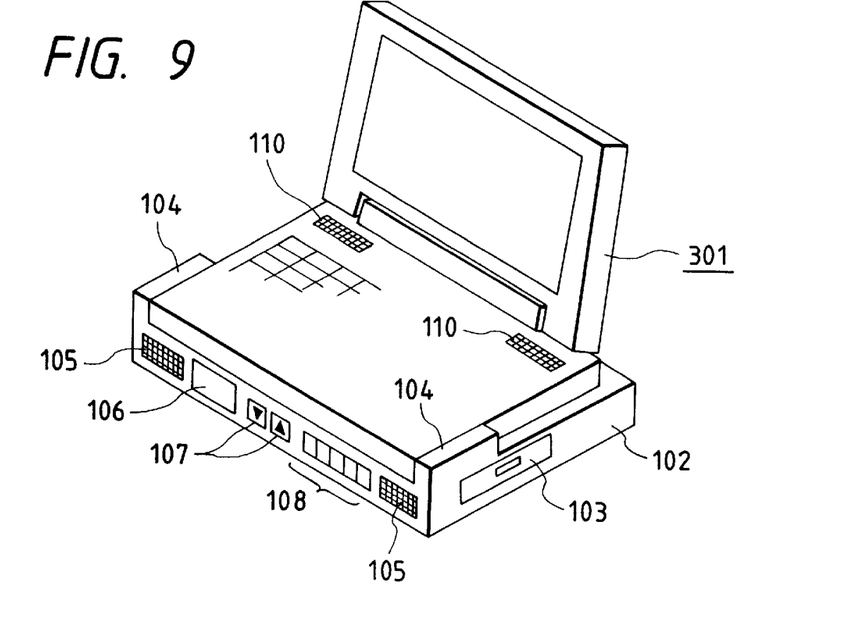
FIG. 9 is a schematic perspective view showing the docked state of the information processing system of the fifth embodiment.
Figure 10:
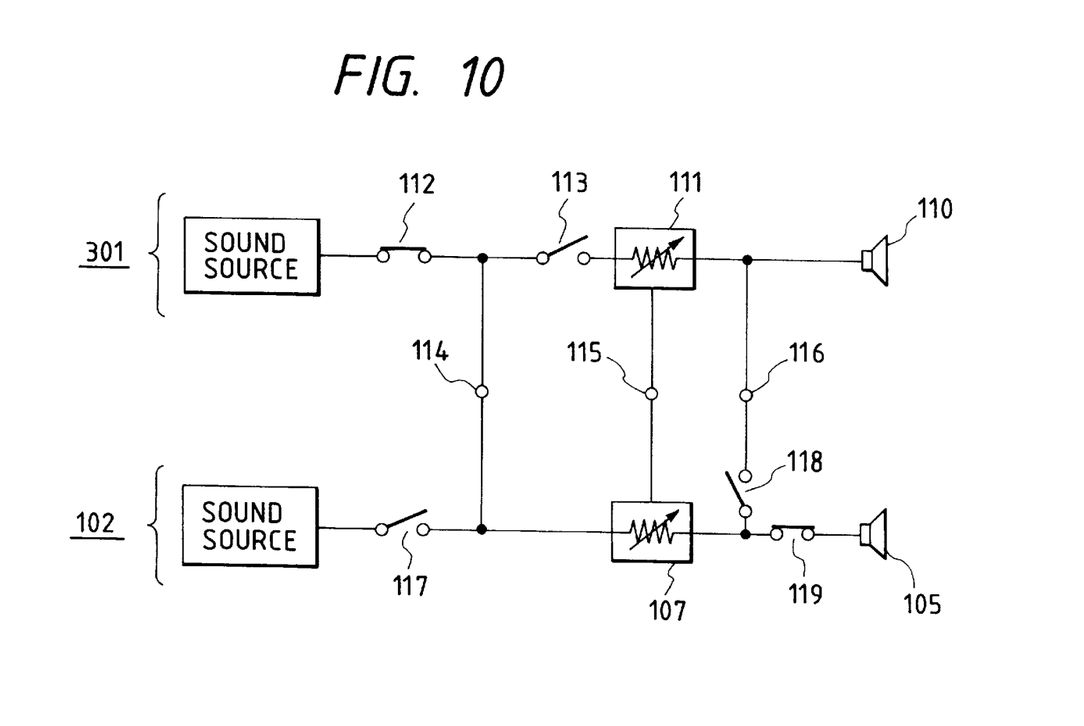
FIG. 10 is a circuit block diagram illustrating sound generation from a speaker.

When the note type personal computer 301 and the docking station 102 are docked together by using the docking connector 109, the contacts 114, 115, and 116 are opened as shown in FIG. 10. In response to a connection detection of the docking connector 109, the switch 113 is opened so that all audio signals are not supplied to the resistor associated with the sound volume slider 111, but are supplied to the resistor associated with the software volume structure 107. In this case, a signal indicating the value of the resistance set by the sound volume slider 111 is supplied via the contacts 115 to the side of the software volume structure 107. As a result, the side of the software volume structure 107 changes the gain of the amplifier circuit in accordance with the resistance value set by the volume slider 111. The gain of the amplifier circuit for the stereo speakers 110 is set so that the same sound volume as that obtained when the volume slider is singularly used can be produced, whereas the gain of the amplifier circuit for the stereo speakers 105 is set so that the same sound volume as that of the stereo speakers 110 while considering the efficiency of the stereo speakers 105 can be produced. Therefore, the same sound volume as that of the stereo speakers 110 of the note type personal computer 301 adjusted by the volume slider 111 is output from both the stereo speakers 110 and 105 after the docking, and so a user will not be in trouble. As shown in FIG. 9, in the docking state, the volume slider 111 of the note type personal computer 301 is shielded by volume guards 104 of the docking station 102 and the user cannot touch it. Therefore, only the software volume structure 107 is accessible. The switches 112 and 117 select the sound source of either the note type personal computer 301 or the docking station 102, the switches being displayed on a display by OS or a software application of the note type personal computer 301. A user can select the sound source by designating the displayed software switches. The switches 118 and 119 selects the speakers to be used. Similar to the switches 112 and 117, the switches 118 and 119 are displayed on the display by OS or a software application of the note type personal computer 301. Similarly, a user can select the speakers to be used. If the user selects the stereo speakers 110 of the note type personal computer 301 while the speaker select software application is running, the switch 118 is opened and switch 119 is closed as shown in FIG. 10.

Figure 11:
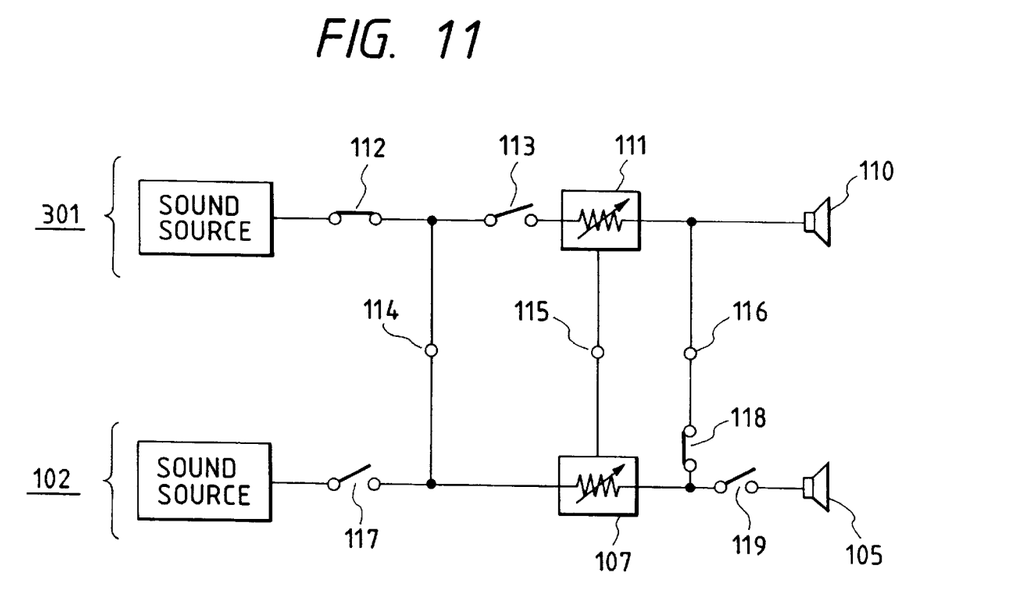
FIG. 11 is a circuit block diagram illustrating sound generation from another speaker.
Figure 12:
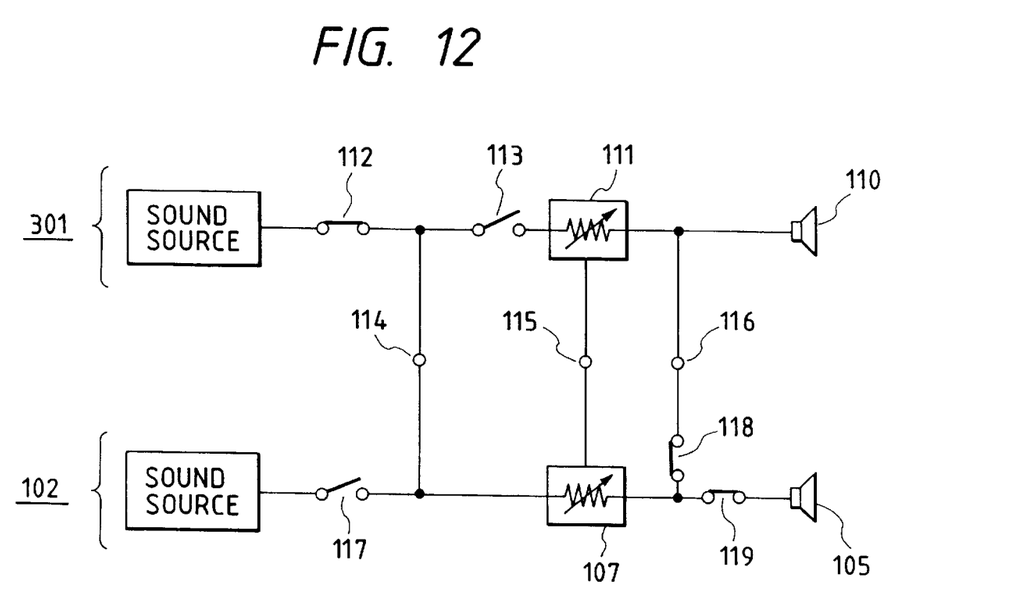
FIG. 12 is a circuit block diagram illustrating sound generation from both the speakers.

If the user selects the stereo speakers 105 of the docking station 102, the switch 118 is closed and the switch 119 is opened as shown in FIG. 11. If the speakers of both the note type personal computer 301 and the docking station 102 are selected, the switches 118 and 119 are both closed as shown in FIG. 11, and sounds are output from the four speakers. Also in this case, the software volume structure sets the gains of the amplifier circuits so that the output sound volume becomes the same as that immediately before the selection is effected.

In the above description, docking is performed by stopping a sound output application of both the note type personal computer 301 and the docking station 102. Obviously, docking may be performed even if one of the note type personal computer 301 and the docking station 102 is reproducing sounds, and an operation panel for controlling the sound source under reproduction may be displayed on the display by a software application of the note type personal computer 301.

In the third embodiment, if the speakers of both the note type personal computer 301 and the docking station 102 reproduce sounds, the frequency characteristics of each speaker may be made different in the manner described with the third and fourth embodiments. In this case, the audio signals are supplied to a known network circuit constituted of coils and capacitors to distribute audio signals to each speaker having the suitable frequency characteristics and reproduce sounds. In this manner, at least a two-way speaker system can be configured and output voices of good quality can be generated.

In the above description, the volume adjustment at the note type personal computer 301 is performed by using the mechanical volume slider. Instead of the volume slider, a software volume control structure may be used obviously. If the note type personal computer only is used, the sound volume may be adjusted by using a keyboard of the note type personal computer 301 or by using an icon on the display. In the docking state, the volume adjustment is basically performed not by the keyboard of the note type personal computer but by the software volume structure of the docking station 102. However, since the note type personal computer also has a software volume control, the gain set to each amplifier circuit may be informed to each other so that the volume control can be performed by both the note type personal computer and the docking station.

What is claimed is:

1. An information processing method, comprising the steps of:
   preparing a first audio signal processing system, the first audio signal processing system comprising:
      first input means for inputting an audio signal,
      first audio signal adjusting means for adjusting a characteristic of the audio signal inputted by the first input means, and
      first audio signal output means for outputting the audio signal adjusted by the first audio signal adjusting means;
   preparing a second audio signal processing system connectable with the first audio signal processing system, the second audio signal processing system comprising:
      second input means for inputting an audio signal,
      second audio signal adjusting means for adjusting a characteristic of the audio signal inputted by the second input means, and
      second audio signal output means for outputting the audio signal adjusted by the second audio signal adjusting means; and
   when the first and second audio signal processing systems are connected,
      dividing the audio signal adjusted by the first audio signal adjusting means into at least two kinds of audio signals in accordance with a frequency characteristic of the adjusted audio signal, and outputting one of the divided audio signals through the first audio signal output means and another one of the divided audio signals through the second audio signal output means;
   when the first and second audio signal processing systems are unconnected,
      outputting all of the audio signal adjusted by the first audio signal adjusting means through the first audio signal output means.

2. An information processing method according to claim 1, wherein the operation of the first audio signal adjusting means is inhibited while the second audio signal adjusting means adjusts the characteristic of the audio signal inputted by said second input means.

3. An information processing method according to claim 1, further comprising the steps of:
   inputting an amplification factor to the first audio signal adjusting means; and
   controlling the amplification of the audio signal by the first audio signal adjusting means in accordance with the input amplification factor.

4. An information processing method according to claim 1, further comprising the steps of:
   inputting an amplification factor to the second audio signal adjusting means; and
   controlling the amplification of the audio signal by the second audio signal adjusting means in accordance with the input amplification factor.

5. An information processing method according to claims, further comprising the steps of:
   dividing the audio signal adjusted by the second audio signal adjusting means into at least two kinds of audio signals in accordance with a frequency characteristic of this divided audio signal;
   outputting one of these divided audio signals through the first audio signal output means; and
   outputting another one of these divided audio signals through the second audio signal output means.

6. An information processing method according to claim 1, further comprising the steps of:
   displaying all kinds of audio signals capable of being output at the first audio signal processing system, on a display screen; and
   designating a control of the audio signals on the display screen.

7. An information processing method according to claim 1, further comprising the steps of:
   displaying all kinds of audio signals capable of being output at the second audio signal processing system, on a display screen; and
   designating a control of the audio signals on the display screen.

8. An information processing method according to claim 1, further comprising the steps of:
   displaying the kinds of audio signals output from the first and second audio signal output means, on a display screen; and
   designating a control of the audio signals on the display screen.

9. An information processing method according to claim 1, wherein at least one of the first and second audio signal output means is a speaker.

10. An information processing method comprising the steps of:

preparing a first audio signal processing system connectable with a second audio signal processing system, the first audio signal processing system comprising:
first input means for inputting an audio signal,
first audio signal adjusting means for adjusting a characteristic of the audio signal inputted by the first input means, and
first audio signal output means for outputting the audio signal adjusting means;

when the second audio signal processing system is connected to the first audio signal processing system, dividing the audio signal adjusted by the first audio signal adjusting means into at least two kinds of audio signals in accordance with a frequency characteristic of the adjusted audio signal, and outputting one of the divided audio signals through the first audio signal output means and another one of the divided audio signals through a second audio signal output means included in the second audio signal processing system, wherein the second audio signal processing system also includes second input means for inputting an audio signal and second audio signal adjusting means for adjusting a characteristic of this audio signal and for outputting an adjusted version of this audio signal through the second audio signal output means; and when the second audio signal processing system is unconnected to the first audio signal processing system, outputting all of the audio signal adjusted by the first audio signal adjusting means through the first audio signal output means.

11. An information processing method according to claim 10, wherein at least one of the first and second audio signal output means is a speaker.

12. An information processing apparatus comprising:
first audio signal processing system, the first audio signal processing system comprising:
first input means for inputting an audio signal,
first audio signal adjusting means for adjusting a characteristic of the audio signal inputted by the first input means, and
first audio signal output means for outputting the audio signal adjusted by the first audio signal adjusting means, and
a second audio signal processing system connectable with the first audio signal processing system, the second audio signal processing system comprising:
second input means for inputting an audio signal,
second audio signal adjusting means for adjusting a characteristic of the audio signal inputted by the second input means, and
second audio signal output means for outputting the audio signal adjusted by the second audio signal adjusting means;
wherein the first audio signal processing system further comprises:
dividing means being operable for dividing the audio signal adjusted by the first audio signal adjusting means into at least two kinds of audio signals in accordance with a frequency characteristic of the adjusted audio signal, and for outputting one of the divided audio signals through the first audio signal output means and another one of the divided audio signals through the second audio signal output means, when the first and second audio signal processing systems are interconnected; and
means for outputting all of the audio signal adjusted by the first audio signal adjusting means through the first audio signal output means, when the first and second audio signal processing systems are unconnected.

13. An information processing apparatus according to claim 12, wherein at least one of the first and second audio signal output means is a speaker.

14. An information processing apparatus, according to claim 12, wherein said operation of the first audio signal adjusting means is inhibited while the second audio signal adjusting means adjusts the characteristic of the audio signal inputted by said second input means.

15. An information processing apparatus according to claim 12, further comprising:
input means for inputting an amplification factor to the first audio signal adjusting means; and
control means for controlling the amplification of the audio signal by the first audio signal adjusting means in accordance with the input amplification factor.

16. An information processing apparatus according to claim 12, further comprising:
input means for inputting an amplification factor to the second audio signal adjusting means; and
input means for controlling the amplification of the audio signal by the second audio signal adjusting means in accordance with the input amplification factor.

17. An information processing apparatus according to claim 12, further comprising:
means for dividing the audio signal adjusted by the second audio signal adjusting means into at least two kinds of audio signals in accordance with a frequency characteristic of the divided audio signal;
means for outputting one of the divided audio signals through the first audio signal output means; and
means for outputting another one of the divided audio signals through the second audio signal output means.

18. An information processing apparatus according to claim 12, further comprising:
display means for displaying all kinds of audio signals capable of being output at the first audio signal processing system, on a display screen; and
designating means for designating a control of the audio signals on the display screen.

19. An information processing apparatus according to claim 12, further comprising:
display means for displaying all kinds of audio signals capable of being output at the second audio signal processing system, on a display screen; and
designating means for designating a control of the audio signals on the display screen.

20. An information processing apparatus according to claim 12, further comprising:
display means for displaying the kinds of audio signal outputs from the first and second audio signal processing means, on a display screen; and
designating means for designating a control of the audio signals on the display screen.

21. An audio signal processing apparatus, comprising:
a first audio signal processing system connectable with a second audio signal processing system, the first audio signal processing system comprising:

first input means for inputting an audio signal, first audio signal adjusting means for adjusting a characteristic of the audio signal inputted by the first input means, and first audio signal output means for outputting the audio signal adjusting means;

dividing means being operable for dividing the audio signal adjusted by the first audio signal adjusting means into at least two kinds of audio signals in accordance with a frequency characteristic of the adjusted audio signal, and for outputting one of the divided audio signals through the first audio signal output means and another one of the divided audio signal signals through a second audio signal output means included in the second audio signal processing system, when a second audio signal processing system is connected to the first audio signal processing system, wherein the second audio signal processing system also includes second input means for inputting an audio signal and second audio signal adjusting means for adjusting a characteristic of this audio signal and for outputting an adjusted version of this audio signal through the second audio signal output means; and means for outputting all of the audio signal adjusted by the first audio signal adjusting means through the first audio signal output means, when the second audio signal processing system is unconnected to the first audio signal processing system.

22. An audio signal processing apparatus according to claim 21, wherein at least one of the first and second audio signal output means is a speaker.

23. A computer-readable medium storing a program for executing processing comprising the steps of:

preparing a first audio signal processing system, the first audio signal processing system comprising:

first input means for inputting an audio signal, first audio signal adjusting means for adjusting a characteristic of the audio signal inputted by the first input means, and first audio signal output means for outputting the audio signal adjusted by the first audio signal adjusting means;

preparing a second audio signal processing system connectable with the first audio signal processing system, the second audio signal processing system comprising:

second input means for inputting an audio signal, second audio signal adjusting means for adjusting a characteristic of the audio signal inputted by the second input means, and second audio signal output means for outputting the audio signal adjusted by the second audio signal adjusting means; and when the first and second audio signal processing systems are connected, dividing the audio signal adjusted by the first audio signal adjusting means into at least two kinds of audio signals in accordance with a frequency characteristic of the adjusted audio signal, and outputting one of the divided audio signals through the first audio signal output means and another one of the divided audio signals through the second audio signal output means;

when the first and second audio signal processing systems are unconnected, outputting all of the audio signal adjusted by the first audio signal adjusting means through the first audio signal output means.

24. A computer-readable medium storing a program for executing processing according to claim 23, wherein said operation of the first audio signal adjusting means is inhibited while the second audio signal adjusting means adjusts the characteristic of the audio signal inputted by said second input means.

25. A computer-readable medium storing a program for executing processing according to claim 23, further comprising the steps of:

inputting an amplification factor to the first audio signal adjusting means; and controlling the amplification of the audio signal by the first audio signal adjusting means in accordance with the input amplification factor.

26. A computer-readable medium storing a program for executing processing according to claim 23, further comprising the steps of:

inputting an amplification factor to the second audio signal adjusting means; and controlling the amplification of the audio signal by the second audio signal adjusting means in accordance with the input amplification factor.

27. A computer-readable medium storing a program for executing processing according to claim 23, further comprising the steps of:

dividing the audio signal adjusting by the second audio signal adjusting means into at least two kinds of audio signals in accordance with a frequency characteristic of the divided audio signal;

outputting one of the divided audio signals through the first audio signal output means; and outputting another one of the divided audio signals through the second audio signal output means.

28. A computer-readable medium storing a program for executing processing according to claim 23, further comprising the steps of:

displaying all kinds of audio signals capable of being output at the first audio signal processing system, on a display screen; and designating a control of the audio signals on the display screen.

29. A computer-readable medium storing a program for executing processing according to claim 23, further comprising the steps of:

displaying all kinds of audio signals capable of being output at the second audio signal processing system, on a display screen; and designating a control of the audio signals on the display screen.

30. A computer-readable medium storing a program for executing processing according to claim 23, further comprising the steps of:

displaying the kinds of audio signals output from the first and second audio signal processing means, on a display screen; and designating a control of the audio signals on the display screen.

31. A computer-readable medium storing a program for executing processing according to claim 23, wherein at least one of the first and second audio signal output means is a speaker.

32. A computer-readable medium storing a program for executing processing comprising the steps of:

preparing a first audio signal processing system connectable with a second audio signal processing system, the first audio signal processing system comprising:

first input means for inputting an audio signal, first audio signal adjusting means for adjusting a characteristic of the audio signal inputted by the first input means, and first audio signal output means for outputting the audio signal adjusting means;

when the second audio signal processing system is connected to the first audio signal processing system, dividing the audio signal adjusted by the first audio signal adjusting means into at least two kinds of audio signals in accordance with a frequency characteristic of the adjusted audio signal, and outputting one of the divided audio signals through the first audio signal output means and another one of the divided audio signals through a second audio signal output means included in the second audio signal processing system, wherein the second audio signal processing system also includes second input means for inputting an audio signal and second audio signal adjusting means for adjusting a characteristic of this audio signal and for outputting an adjusted version of this audio signal through the second audio signal output means; and when the second audio signal processing system is unconnected to the first audio signal processing system, outputting all of the audio signal adjusted by the first audio signal adjusting means through the first audio signal output means.

33. A computer-readable medium storing a program for executing processing according to claim 32, wherein at least one of the first and second audio signal output means is a speaker.

* * * * *

UNITED STATES PATENT AND TRADEMARK OFFICE
CERTIFICATE OF CORRECTION

PATENT NO. : 6,148,243
DATED : November 14, 2000
INVENTOR(S) : Masashi Ishii et al.

It is certified that error appears in the above-identified patent and that said Letters Patent is hereby corrected as shown below:

Title page,
Item [56] Foreign Patent Documents, insert,
-- 230247 11/1994 Taiwan --.
-- 97-29005 6/1997 Korea --.
Item [*], Notice, Insert, -- This patent issued on a continued prosecution application filed under 37 CFR 1.53 (d), and is subject to the twenty year patent term provisions of 35 U.S.C. 154 (a) (2). --.
Item [56], U. S. Patent Documents, "Carber" should read -- Carver --.

Column 1,
Line 42, "adjusts" should read -- adjust --.

Column 9,
Line 67, "means; and" should read -- means; --.

Column 10,
Line 9, "means;" should read -- means; and --
Line 35, "claims," should read -- claim 1, --.

Column 11,
Line 48, "means, and" should read -- means; --.
Line 49, "a second" should read -- second --.

Column 12,
Line 65, "a first" should read -- first --.

UNITED STATES PATENT AND TRADEMARK OFFICE
CERTIFICATE OF CORRECTION

PATENT NO. : 6,148,243
DATED : November 14, 2000
INVENTOR(S) : Masashi Ishii et al.

It is certified that error appears in the above-identified patent and that said Letters Patent is hereby corrected as shown below:

<u>Column 13,</u>
Line 13, "signal" (1st occurrence) should be deleted.
Line 52, "and" should be deleted.
Line 61, "adjusts" should read -- adjust --.

Signed and Sealed this

Thirteenth Day of November, 2001

*Attest:*

*Attesting Officer*

NICHOLAS P. GODICI
*Acting Director of the United States Patent and Trademark Office*